Oct. 4, 1966    M. SCHWARTZ ET AL    3,276,313
CARRIER FOR AUDIBLE AND VISUAL MESSAGES
Filed Jan. 10, 1966    2 Sheets-Sheet 1
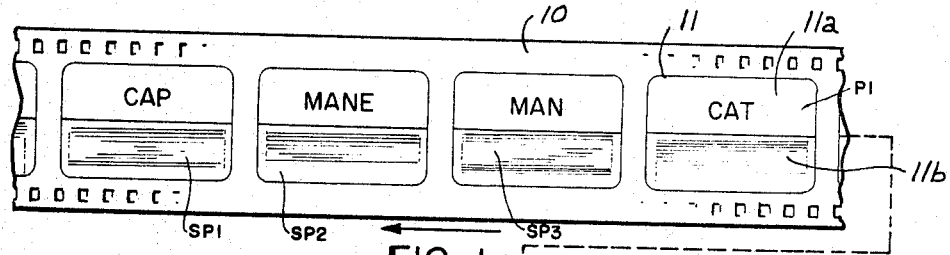
FIG. 1
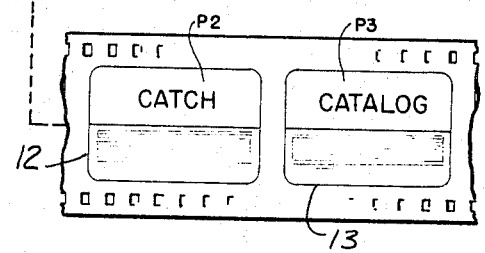
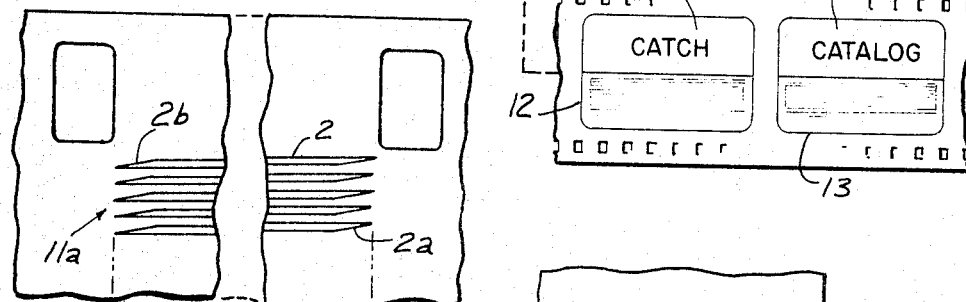
FIG. 2
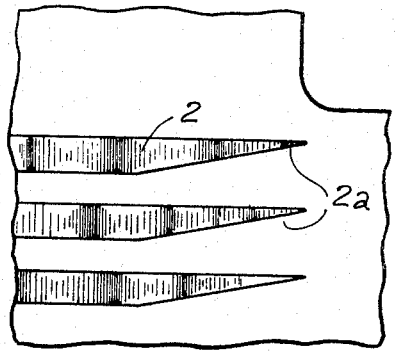
FIG. 3
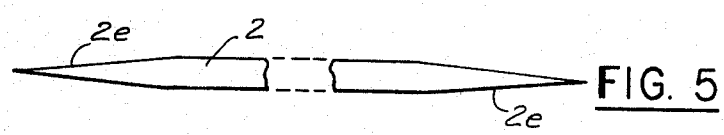
FIG. 4
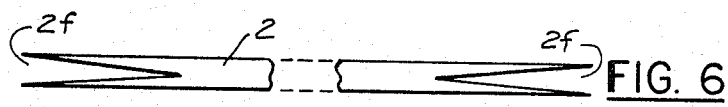
FIG. 5
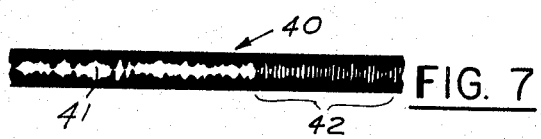
FIG. 6
FIG. 7
INVENTORS
MORRIS SCHWARTZ
WERNER K. BENDER
BY
ATTORNEYS

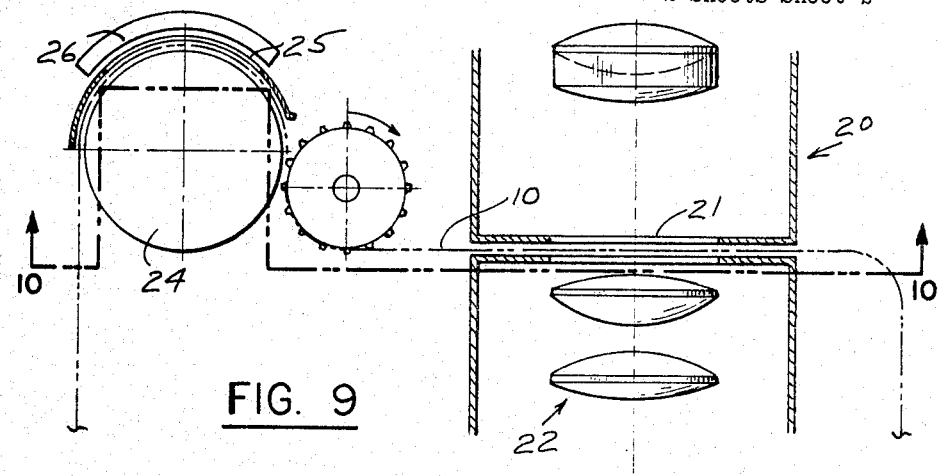
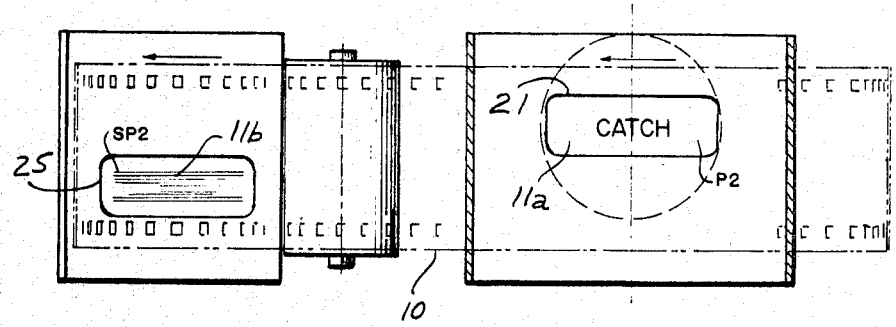
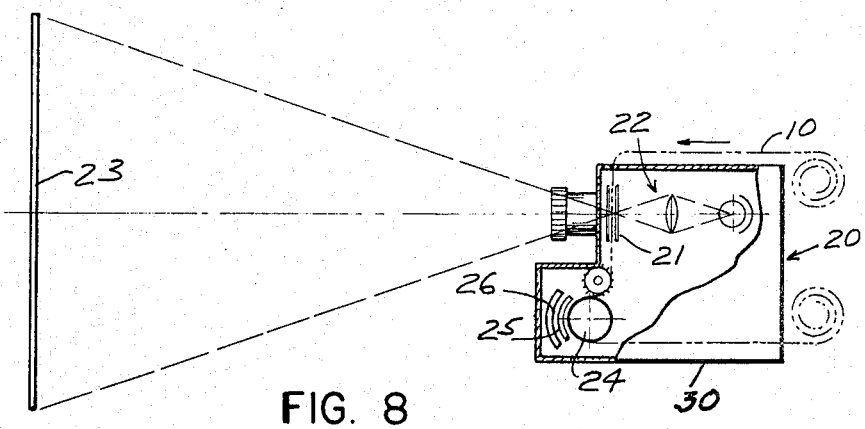

United States Patent Office 3,276,313
Patented Oct. 4, 1966

3,276,313
CARRIER FOR AUDIBLE AND VISUAL MESSAGES
Morris Schwartz and Werner K. Bender, Plainville, Conn., assignors to The Kalart Company Inc., Plainville, Conn., a corporation of New York
Filed Jan. 10, 1966, Ser. No. 519,773
7 Claims. (Cl. 88—24)

The present invention relates to a carrier having one or several audible messages and one or several visual messages, each audible message being associated with a visual message to constitute a program or presentation.

More particularly, the invention relates to a carrier the audible message on which is formed a plurality of parallel rectilinear sound track sections disposed side by side. The term "visual message" as hereinafter used in intended to encompass pictorial representations of an object, letters or words, symbols of notes, etc.

The present application is a continuation-in-part application of our co-pending application Serial No. 113,771, filed May 31, 1961, and issued as Patent No. 3,230,824.

Simultaneous or successive reproduction of the audible message and viewing of the visual message on a carrier according to the invention may be effected by inserting the carrier into a suitable and conventional sound-reproducing and viewing apparatus in which the sound track sections which in toto constitute a sound record area, are sequentially scanned and the visual message is made viewable while the carrier is stationary in the apparatus. A sound projector suitable for the purpose is disclosed, for instance, in prior Patents 3,001,030 and 3,001,444.

The audible message may consist of any kind of recorded sound, such as speech, music, natural sounds—for instance, heartbeats—noise of machinery, etc. The recorded sound may also be outside the audible frequency range, in which event suitable and conventional equipment responsive to such sound outside the normal audible frequency range may trigger other equipment.

According to one object of the invention, one or several areas for the sound message are disposed in one lengthwise row, and one or several areas for the visual message are disposed in a second parallel row. Either row may be the upper one.

The sound track sections may be recorded by the variable density method or the variable area method. Recording may be effected photographically or magnetically. A variable area type of sound track may be printed with magnetically conductive ink, which may also be used to print the visual message. In other words, both types of message can be produced in one operation by conventional printing techniques and conventional printing presses. The carrier is preferably a length of film on which the audible message areas and the visual message areas are photographically printed. The visual message may be projected during playback of the audible message upon a viewing screen in a conventional fashion, but if the visual message is in the form of an opaque picture, such picture may be viewed by epidiascopic viewing. In the event the carrier is a sheet of paper on which the messages are printed, a plurality of sheets may be bound in a book, inserted into a suitable binder or simply placed in a container.

Film strips and other carriers bearing sound messages and visual messages as hereinbefore described may be advantageously used for teaching and training purposes, for instance, for teaching foreign languages or teaching children to read. For such teaching purposes, the visual messages may consist of words or parts thereof and the sound messages of an audible reproduction of the words.

According to another object of the invention, a sound projector for projecting the visual messages and for reproducing the audible messages on a film strip according to the invention comprises a projecting assembly including a mask obturating the audible message area on each frame of the film and a sound reproducing assembly including a mask obturating the visual message area on each frame, thereby preventing mutual interference between said areas when the projector is operated for projection and sound reproduction.

Other and further objects, features and advantages of the invention will be pointed out hereinafter and set forth in the appended claims constituting part of the application.

In the accompanying drawing, several preferred embodiments of the invention are shown by way of illustration, and not by way of limitation.

In the drawing:

FIG. 1 is a fragmentary plan view of a message carrier according to the invention;

FIG. 2 is a plan view view of one of the sound track areas on the carrier on an enlarged scale, the track sections forming the area having fade-out and fade-in portions to obtain a smooth transition from one track section to the other;

FIG. 3 is a further enlargement of the track sections shown in FIG. 2;

FIGS. 4, 5 and 6 are detailed views of individual sound track sections showing several modifications of fade-in and fade-out portions of the track sections;

FIG. 7 is a fragmentary view of a variable area type sound track section with a fade-out portion or fade-in portion of the variable density type;

FIG. 8 is a diagrammatic elevational view, partly in section, of a sound projector according to the invention for use with a film strip according to the invention;

FIG. 9 is a digrammatic plan view of components of the visual assembly and the sound reproducing assembly of the projector of FIG. 8; and FIG. 10 is a side view of FIG. 9.

Referring first to FIG. 1 in detail, this figure shows a strip of film 10, which should be visualized as a conventional motion picture film of standard width, such as 35 or 16 mm. The strip of film is divided into a plurality of lengthwise spaced frame areas 11, 12, 13, etc. Each of the frames is divided lengthwise into two frame parts, indicated for frame 11 by 11a and 11b. The lower part of each frame has recorded thereon a sound record area. Each sound record area includes a plurality of individual discontinuous and generally longitudinally oriented sound track sections. The track sections are parallel to each other but slightly inclined in reference to either longitudinal edge of the strip of film. While in theory any number of such parallel track sections may be provided, in practice the number of sections is limited by the transverse width of the available frame part and the required spacing between each two track sections. The track sections may be as close to each other as is compatible with the scanning of the sound track. The track sections should be visualized as constituting part of a helix when a sound track area is brought into a cylindrical configuration for playback and viewing in a projector as disclosed in the aforementioned prior patents.

The sound track sections on each frame part may be in the form of a word or may be a continuing message when sequentially scanned, one end of each track section and the beginning of the next adjacent track section constituting a continuation of the recorded message. To effect a continuous and smooth reproduction of sound from such discontinuous track sections, each track section has at its end a fade-out portion and at its beginning a fade-in portion. These portions are shown as wedge-shaped fade-out portions 2a and fade-in portions 2b. As is clearly shown in FIG. 2, the slanted lines of the two wedge portions of each track section face in opposite directions at the two ends of each section.

Assuming now that the scanning is effected by sequentially scanning successive track sections, starting with the lowermost section and proceeding toward the uppermost section, it may be observed that scanning of the fade-out portion of a track section coincides with the scanning of the fade-in portion of the next upper track section. Consequently, if the scanning operation is so correlated that the scanning of the fade-out portion and the corresponding fade-in portion overlap accurately, a smooth reproduction of sound is obtained. In other words, when the sound record areas shown in FIG. 1 are brought into a cylindrical shape in the projector, the sound track sections constitute a continuous helical sound track of uniform effective width from which continuous sound can be reproduced.

As is apparent, FIG. 3 shows fade-out portions when scanning is effected from left to right, but fade-in portions when scanning is effected from right to left.

According to FIG. 4, each track section is formed at both ends with wedge-shaped portions 2d facing in the same direction.

FIG. 5 shows a tapered portion 2e at both ends of the track sections.

FIG. 6 shows swallow-tailed or serrated end portions 2f.

In each of the exemplified configurations of the end portions according to FIGS. 4, 5 and 6, the decrease in the sound volume at the end of the scanning of a track section is matched by a corresponding increase in the sound volume at the beginning of the scanning of the next following track section, as seen in the direction in which the scanning progresses, for instance, from the lowermost track section toward the uppermost track section.

In the event the track is recorded in accordance with the variable area type method, fade-out and fade-in at the end and the beginning, respectively, of each track section may be effected by combining a variable area type track section 41 with a variable density type pattern 42. As is shown in FIG. 7, the variable density pattern is superimposed upon the variable area pattern and gradually increases in density toward the respective end of the track section, at which the pattern is shown to be opaque. During scanning, the track section is brought to a cylindrical shape, as previously described, and the variable density pattern at the end of a track section and the variable density pattern at the beginning of the next adjacent track section are simultaneously scanned so that the density of the scanned patterns correspondingly increases and decreases, respectively, whereby the sound volume is maintained at a substantially constant level during the transition of the scanning from one track section to the next one.

The second part of each frame, which is the upper part thereof in FIG. 1, is occupied by the visual message. Assuming that the film strip is designed for teaching reading or for improving the vocabulary of a student, the visual message may consist of a word. By way of exemplification, the words, "Cap," "Mane," "Man," and "Cat" are indicated.

In the exemplification of FIG. 1, frame parts containing a visual message are identified by the letter P followed by the frame number, and similarly, frame parts occupied by a sound record area are identified by the letters SP followed by a frame number. The visual message P1 is associated with the sound message SP1; the visual message P2 (not shown) with the sound message SP2, and so forth. As may be noted, the associated messages are not on the same frame, but are staggered in reference to each other. Such staggering is convenient to provide adequate space in the projector for coaction of the sound equipment of the projector with frame part SP and coaction of the projecting equipment with a frame part P. However, it should be pointed out that such staggering is not essential for the concept of the invention. The necessity for and the extent of the staggering of the associated frame parts are controlled by the construction of the projector in which the teaching film strip is used. The sound messages are shown anteriorly of the associated visual messages as seen in the direction of the travel of the film strip through the projection, but the relative disposition of the messages may also be reversed.

As is also apparent from FIG. 1, a single frame of standard width film, such as 35 mm. or 16 mm. motion picture film, is utilized to accommodate both a visual message and a sound message. Accordingly, the total length of film required to accommodate a given number of messages is only half of what is required when an entire frame is used for an audible message and a visual message, respectively. In actual practice, the number of messages required in a major teaching laboratory may be many thousands, and the saving of film obtainable with the arrangement according to the invention is a very important feature.

FIGS. 8 through 10 show a projector designed for use with a film strip according to the invention, as previously described. Only those components of the projector which are essential for the understanding of the invention are diagrammatically shown. Projectors suitable to be modified for the purpose of the invention are known in the art and more fully described in aforementioned Patents 3,001,030 and 3,001,444.

Referring now to FIGS. 8 through 10 more in detail, the exemplified projector 20 comprises a housing 30 within which is suitably arranged an optical assembly 22 and a sound reproducing assembly. The sound reproducing assembly is symbolized by a circle 24 which should be visualized as indicating a rotary and axially displaceable scanning system of the kind fully described in the aforementioned patents and by a light receiver 26, such as a photoconductive cell, responsive to light modulated by the scanning system in accordance with the scanned sound tracks on the film and controlling a conventional sound reproducing system in accordance with such modulated light. A film strip of the kind shown in detail in FIG. 1 is guided past the gates of the optical assembly and of the sound reproducing assembly and transported step-by-step, all as fully described in the aforementioned patents. Images of the words on frame parts P of film strip 10 may be projected upon a screen 23.

As it is evident, projection of a frame, such as frame 11, upon screen 23 will not only show an image of the frame part 11a bearing the word Cat, but also an image of the sound track area on frame part 11. Such as showing of the sound track area juxtaposed with the word to be taught (the word Cat on frame 11) is confusing to a child being taught and will tend to detract the attention of the child. As it is also evident, placement of a frame, such as frame 11 in the gate of the sound reproducing assembly, will result not only in a playback of the recorded sound track sections as it is desired, but also in random noises caused by the lines forming the letters of the word Cat. Obviously, these lines act in the same way as sound tracks and cause a corresponding modulation of the light directed by the scanning means upon the frame.

The invention avoids detraction of attention and confusion as caused by the showing of sound tracks simultaneously with words and by the production of random noises when the audible message is played back, by including a mask 21 in the optical assembly and a mask 25 in the sound reproducing assembly. As can best be seen in FIG. 10, the aperture of mask 21 is so disposed that it will obturate the sound area part of a frame when the word on the same frame is being projected upon screen 23. Similarly, the aperture of mask 25 is so disposed that it will obturate the part of the frame bearing the visual message when the sound record area on the same frame is being played back.

In the exemplified embodiment of the projector, the audible message obturating mask 21 is interposed in the lens system of the optical assembly and the visual message obturating mask 25 is interposed between the scanning assembly 24 and light receiver 26. Obviously, other suitable locations of the masks may be selected.

As it is now apparent, the interposition of the masks, according to the invention, effectively eliminates the aforedescribed detractions of attention by unwanted images and sounds.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A combination visual message and audible message carrier for viewing the visual message and reproducing the audible message while the carrier is stationary, said carrier comprising a strip of film divided into a plurality of lengthwise spaced frames, each of said frames being divided lengthwise into two frame parts, one part of each frame bearing a recorded audible message and the other part a visual message, each audible message being recorded in the form of a plurality of rectilinear and discontinuous parallel sound track sections disposed side by side, one end of each of said track sections and the opposite end of an adjacent track section constituting a continuation of the audible message, each visual message being paired with an audible message and each of said pairs constituting an audio-visual representation.

2. A carrier according to claim 1, wherein said recorded track sections are variable density type track sections.

3. A carrier according to claim 2, wherein each track section has a fade-in portion at one end and a fade-out portion at the other end, the fade-out portion of each track section being matched with the fade-in portion of the next adjacent track section so that the two portions complement each other to the full width of the track.

4. A carrier according to claim 1, wherein said sound track sections are variable area type track sections.

5. A carrier according to claim 1, wherein the two messages of each pair are disposed in different frames on said strip of film.

6. An assemblage comprising, in combination, a strip of film having thereon a plurality of lengthwise spaced frames, each of said frames being lengthwise divided to form two parallel rows of frame parts, each frame part in one of said rows bearing a recorded sound message and each frame part in the other row bearing a visual message, the sound message bearing part of one frame being associated with the visual message bearing part of another frame; and a sound projector including a sound reproducing assembly for audibly reproducing the recorded sound messages on said one frame part and a light projecting assembly for projecting the visual message on said other frame part, said sound reproducing assembly including a mask obturating the visual message bearing part of each frame placed in position for sound reproduction and said projecting assembly including a mask obturating the sound message bearing part of each frame placed in position for projection, and guide means for guiding successive associated frames into position for reproduction and projection respectively.

7. An assemblage according to claim 6, wherein the sound message recorded on the respective frame part is in the form of a plurality of rectilinear and discontinuous parallel sound track sections disposed side-by-side, one end of each of said track sections and the opposite end of an adjacent sound section constituting a continuation of the sound message.

No references cited.

NORTON ANSHER, *Primary Examiner.*